United States Patent [19]
Reyher et al.

[11] Patent Number: 5,865,589
[45] Date of Patent: Feb. 2, 1999

[54] BALE FEEDER

[75] Inventors: Russell E. Reyher, West St Paul; Randy Reyher, Winnipeg, both of Canada

[73] Assignee: Fleischer Manufacturing, Inc., Columbus, Nebr.

[21] Appl. No.: 852,722

[22] Filed: May 7, 1997

[51] Int. Cl.⁶ ................................................. B02C 13/31
[52] U.S. Cl. .................. 414/412; 241/605; 241/101.742; 414/24.5; 83/401; 83/907
[58] Field of Search ..................... 414/554, 551, 414/441, 412, 24.5, 24.6, 911, 111, 546; 83/907, 423, 401, 435.2; 241/243, 101.5, 101.741, 68, 101.2, 101.742, 223, 605, 106.7, 285.2

[56] References Cited

U.S. PATENT DOCUMENTS

| | | |
|---|---|---|
| 3,999,674 | 12/1976 | Meitl . |
| 4,195,958 | 4/1980 | Vahlkamp . |
| 4,266,899 | 5/1981 | Skeem . |
| 4,449,672 | 5/1984 | Morlock et al. . |
| 4,741,656 | 5/1988 | Bishop . |
| 4,778,322 | 10/1988 | Stronski . |
| 4,789,289 | 12/1988 | Wilson . |
| 5,090,630 | 2/1992 | Kopecky et al. . |
| 5,209,412 | 5/1993 | Dwyer et al. ........................ 241/605 X |
| 5,209,413 | 5/1993 | Dwyer et al. . |
| 5,556,041 | 9/1996 | Cheesman et al. ................. 241/605 X |

FOREIGN PATENT DOCUMENTS

| | | | |
|---|---|---|---|
| 265751 | 5/1988 | European Pat. Off. ................ | 241/605 |
| 2636204 | 3/1990 | France ..................................... | 241/605 |
| 1021411 | 6/1983 | Russian Federation ............... | 241/605 |

*Primary Examiner*—Frank E. Werner
*Attorney, Agent, or Firm*—Emrich & Dithmar

[57] ABSTRACT

The present invention provides a bale feeder for breaking down large cylindrical bales of hay and like animal feeds and spreading it in rows for feeding. The bale feeder comprises a feeder body, a bale lifting means for lifting and positioning a bale within the feeder body, and a bale opening means providing superior dust and mold removal characteristics. The bale feeder is usually towed over the ground behind a vehicle. The bale feeder also includes anti-binding means for reducing the problem of cut twine and hay getting into and binding the cutting means and feed mechanisms.

20 Claims, 5 Drawing Sheets

FIG. 10

BALE FEEDER

FIELD OF THE INVENTION

The present invention provides a bale feeder for breaking down large round bales of hay, and for spreading it in rows for feeding.

BACKGROUND

Farmers and ranchers who keep livestock often use large round bales for mass storage of feed. Various bale feeders and bale transporting devices have been developed which shred the bale so that the feed is in a form for delivering as feed to livestock. Some of these devices are mobile and allow for the transportation and spreading of the bale. These devices however often damage the feed by removing the leaves from the stems of the feed as the bale is shredded, and do a poor job of removing dust and mold from the feed which can be harmful to livestock eating the feed.

Some bale feeders utilize cutting knives mounted on a rotor to shred bales of feed. These bale feeders have the problem of feed and twine from the bales becoming wrapped around the rotor axle which can cause the rotor to bind. This can lead to decreased cutting efficiency and increased maintenance time since removal of the hay and twine can be time consuming.

Bale feeders may also employ a traveling bed having slats mounted on sprocket driven chains which feed the bale into the rotor or other cutting means for shredding. The sprockets which drive the chains are usually mounted on rotating shafts. The sprockets and shafts, like the rotor, are also susceptible to binding by twine and feed.

Bale feeders having traveling beds may also have the problem of excessive wear of the sprocket mounting shafts and sprockets, and twisting of the chain. This can result in excessive vibration of the feeder and damage to the chain. This problem can be due to deflection of the shaft caused by chain tensioners located at the ends of one of the shafts which tension the chains by applying a force to the ends of the shaft.

SUMMARY

According to one aspect of the present invention there is provided a bale feeder for opening a round bale of animal feed, said bale being held together by at least one length of twine, said bale feeder comprising:

a feeder body for receiving the bale, said feeder body having a first side wall;

a bale opening means including:
an opening in the first side wall of the feeder body;
an elongate rotor extending across the opening;
cutting means distributed around and along the rotor and being fixed thereto for engaging the bale and cutting a portion thereof;
a rotor drive means for rotating the rotor;
a traveling bed arranged adjacent a bottom of the first side wall and interior to the feeder body for supporting the bale and for continuously feeding the bale into the cutting means, said traveling bed comprising at least one conveyor chain arranged substantially perpendicular to the elongate rotor, and drive means for driving the conveyor chain comprising a first shaft and at least one sprocket mounted on the first shaft for engaging the at least one conveyor chain;

and anti-binding means for preventing cut animal feed and twine from binding in the drive means, said anti-binding means comprising at least one cutting blade mounted on the feeder body adjacent the first shaft such that the at least one cutting blade lies adjacent and laterally of the at least one sprocket.

The feeder will conventionally be carried on a vehicle, either towed or self-propelled.

The rotor is arranged such that the cutting means engage the side of the bale. The cutting means preferably comprise cutting blades mounted on the rotor. For heavy feed additional cutting blades may be fixed to the top edge of the opening. The additional cutting blades are spaced longitudinally along the top edge to cooperate with the cutting blades on the rotor.

A feeder of this configuration is found to keep the leaves on the stems and to remove mold and dust better than prior art feeders. As the rotor is rotated the cutting blades engage the bale with an upwards motion opening the bale by cutting and directing a portion of the bale upwards through the upper gap. This, is believed to be the primary reason that with this feeder the feed is not damaged by excessive removal of leaves from the stems of the feed or by shredding the feed into small pieces. The superior removal of dust and mold from the feed is believed to be a result of the upwards movement of the feed after cutting. The cut portions of the bale pass through the opening above the rotor after cutting and may be directed downwards by a deflector onto the ground in a row as the bale feeder moves across the ground.

According to a second aspect of the present invention there is provided a bale feeder for opening a round bale of animal feed, said bale being held together by at least one length of twine, said bale feeder comprising:

a feeder body for receiving the bale, said feeder body having a first side wall;

a bale opening means including:
an opening in the first side wall of the feeder body;
an elongate rotor extending across the opening;
cutting means distributed around and along the rotor and being fixed thereto for engaging the bale and cutting a portion thereof;
a rotor drive means for rotating the rotor;
a traveling bed arranged adjacent a bottom of the first side wall and interior to the feeder body for supporting the bale and for continuously feeding the bale into the cutting means, said traveling bed comprising at least one conveyor chain arranged substantially perpendicular to the elongate rotor, and drive means for driving the conveyor chain comprising a first shaft arranged adjacent the first wall, a second shaft spaced from the first shaft, and at least one sprocket mounted on each shaft for engaging the at least one conveyor chain;

and anti-binding means for preventing cut animal feed and twine from binding in the drive means, said anti-binding means comprising at least one sleeve member arranged around and along a portion of at least one of the first and second shafts, said at least one sleeve member being arranged to rotate freely on said shaft.

According to a third aspect of the present invention there is provided a bale feeder for opening a round bale of animal feed, said bale being held together by at least one length of twine, said bale feeder comprising:

a feeder body for receiving the bale, said feeder body having a a front wall, a rear wall spaced from the front wall, and a side wall extending therebetween;

a bale opening means including:
an opening in the side wall of the feeder body;

an elongate rotor extending across the opening and having a first end and a second end arranged such that the first end lies adjacent the front wall and the second end lies adjacent the rear wall;

cutting means distributed around and along the rotor and being fixed thereto for engaging the bale and cutting a portion thereof;

a rotor drive means for rotating the rotor;

a bale conveyor means for feeding the bale into the cutting means;

and anti-binding means arranged at each end of the elongate rotor for preventing cut animal feed and twine from binding in the elongate rotor, said anti-binding means comprising a curved plate arranged at each of the first and second ends of the elongate rotor, each curved plate being fixed to a respective one of the front and rear walls of the feeder body and extending over a respective end of the elongate rotor and around at least a portion of a circumference thereof.

One embodiment of the invention will now be described in conjunction with the accompanying drawings in which.

BRIEF DESCRIPTION OF THE DRAWINGS

In the drawings like characters of reference indicate corresponding parts in the different figures.

DETAILED DESCRIPTION

Figure 1:
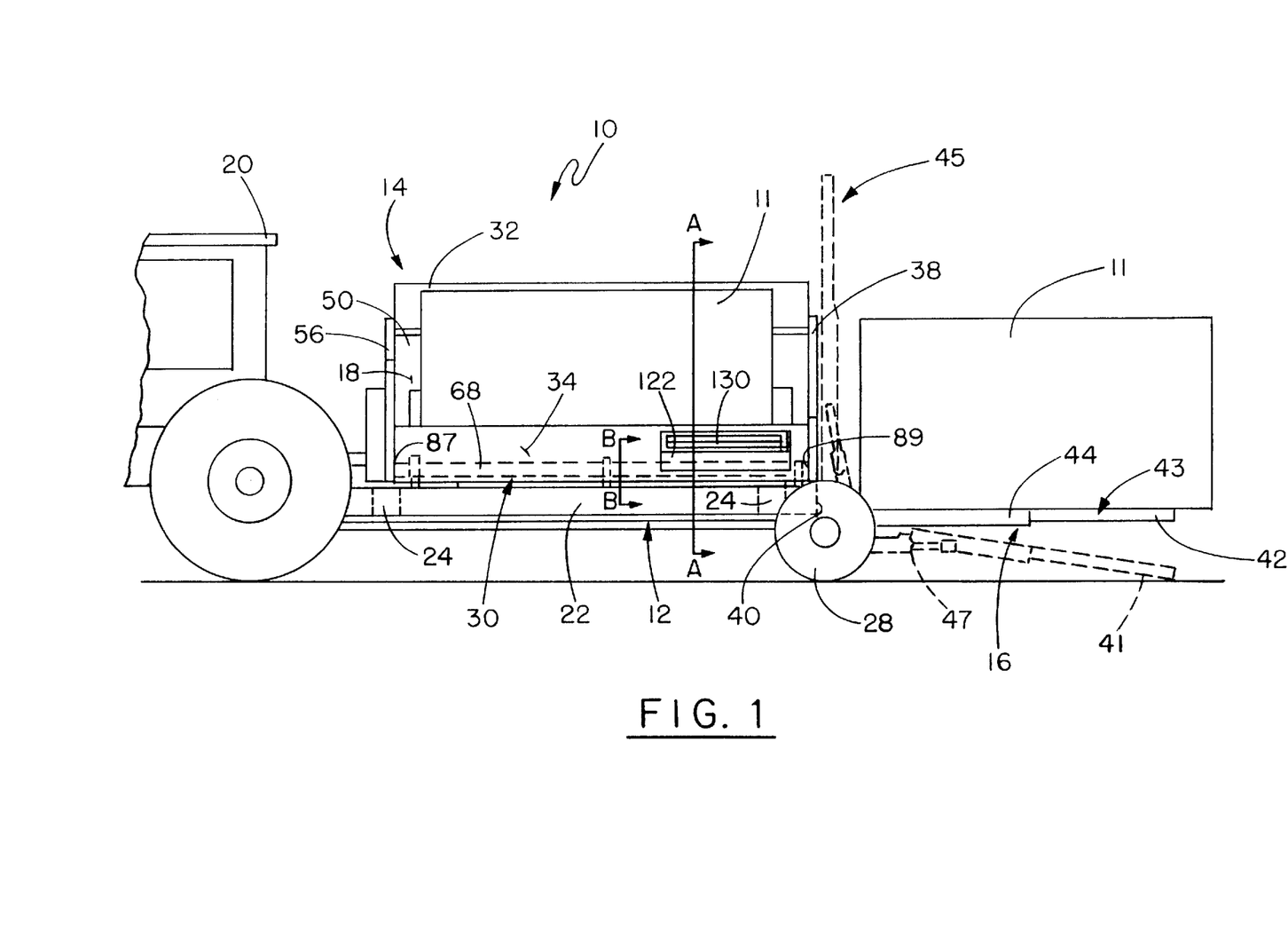
FIG. 1 is a side view of the bale feeder and towing vehicle.
Figure 2:
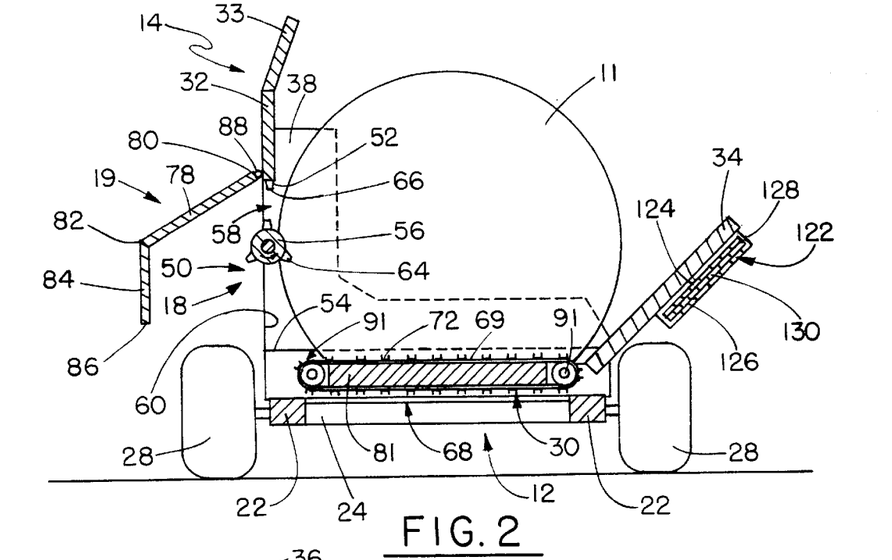
FIG. 2 is a cross section of the bale feeder through A—A of FIG. 1.

Referring to FIGS. 1 and 2 the bale feeder is shown generally at 10. The bale feeder 10 is for use in opening large round bales 11 of animal feed, which are usually held together by at least one length of twine. The bale feeder 10 comprises a frame 12, a feeder body 14, a bale lifting means 16 for lifting and positioning a bale 11 of animal feed within the feeder body 14, and a bale opening means 18. The bale feeder 10 is usually towed over the ground behind a vehicle 20. Power for the bale lifting means 16 and the bale opening means 18 is provided by the vehicle 20.

The frame 12 comprises a pair of parallel frame members 22 fixed to one another by cross members 24. A hitch is located at the front end of the feeder 12 for connecting to the towing vehicle 20. Wheels 28 are located at the rear end of the feeder 12 to support the feeder 12 and to allow it to be moved over the ground.

The feeder body 14 is mounted on the frame 12 for receiving the bale 11 and to hold the bale 11 in place for opening. The feeder body 14 also houses the bale opening means 18 and includes an open bottom 30 and side walls 32, 34, 36, and 38.

The side walls include a first side wall 32 arranged substantially vertically, and extending upwards from the open bottom 30. The first side wall 32 extends upwards to a position above the height of a typical bale 11 and has an inwardly inclined upper section 33. The first side wall 32 provides a surface up against which the bale 11 is held as the bale 11 is fed into the bale opening means 18. A second side wall 34 is arranged opposite the first side wall 32 and gradually slopes upwards and outwards from the open bottom 30. The slope of the second side wall 34 directs the bail in towards the feeder body 14 and first side wall 32 during loading.

A front side wall 36 extends between the first and second side walls 32 and 34 and extends upwards from the open bottom 30. A rear side wall 38 lies opposite to the front side wall 36 and likewise extends between first and second side walls 32 and 34 and upwards from the open bottom 30. The rear side wall 38 is much lower than the front side wall 36 to allow the bail 11 to pass over it during loading.

The bale lifting means 16 comprise a powered fork lift 16 for engaging the bale 11 longitudinally. The fork lift 16 engages an underside of the bale 11 lifting it off of the ground, and is then able to either support the bale 11 above the ground for transportation, or load the bale 11 into the feeder body 14 for opening.

The fork lift 16 is pivotally fixed at a first end adjacent a rear side 40 of the frame 12, and has forks 42 extending outwards from a second end 44 lying opposite the rear side 40 of the frame 12. The forks 42 on the fork lift 16 are laterally adjustable to accommodate various sized bales. Remote actuating means allow the operator to actuate the forks 42 from within the towing vehicle 20. The fork lift 16 may be actuated such that the forks 42 move from a lifting position 41, to an inclined carrying position 43, and to a vertical loading position 45 for loading the bale 11 into the feeder body 14.

The fork lift 16 is hydraulically powered having hydraulic cylinders 47 which take hydraulic power from a hydraulic system on the towing vehicle 20.

Referring to FIGS. 2 to 5 the bale opening means 18 includes an opening 50 in the first side wall 32 of the feeder body 14. The opening 50 has a top edge 52 and a bottom 54 and extends through the first side wall 32 from the interior to the exterior of the feeder body 14, and between the front side wall 36 and the rear side wall 38.

A rotor 56 having an axis of rotation 57 lying in a horizontal plane is arranged in the opening 50 such that a portion of the rotor 56 lies within the opening 50. The rotor 56 is spaced downwards from the top edge 52 of the opening 50 leaving a upper gap 58 above the rotor 56 and is spaced upwards from the bottom 54 of the opening 50 leaving a lower gap 60 below said rotor 56. The position of the rotor 56 within the opening 50 is variable in a vertical plane allowing for the bale feeder 10 to be used with various sizes of bales.

The upper gap 58 is defined by a first distance from the top of the rotor 56 to the top edge 52 of the opening 50, and the lower gap 60 is defined by a second distance from a bottom of the rotor 56 to the bottom edge 54 of the opening 50.

Figure 4:
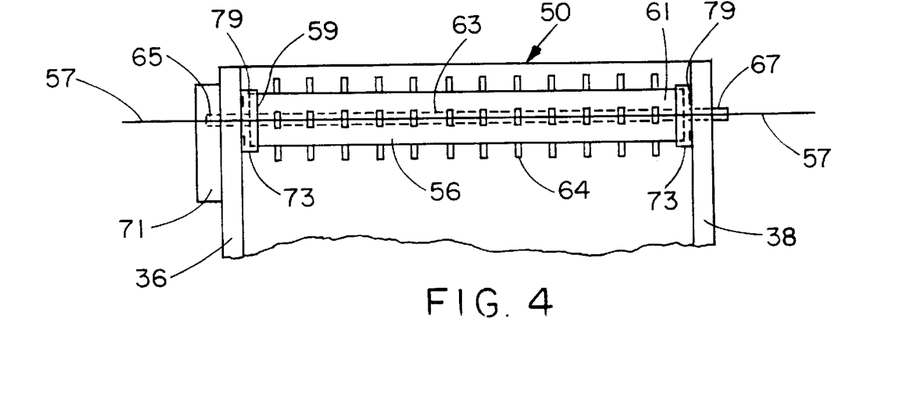
FIG. 4 is a top view of the rotor and the rotor anti-binding means.
Figure 5:
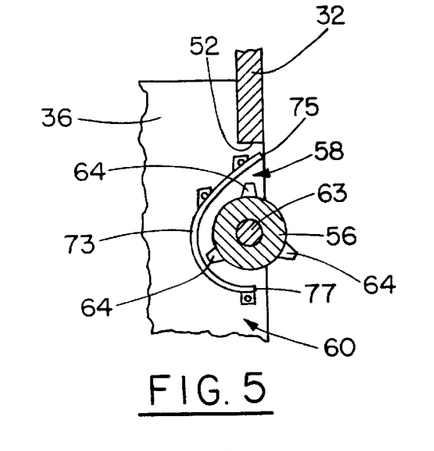
FIG. 5 is a side view of the rotor and anti-binding means.

The rotor 56 has a first end 59, and a second end 61. The first and second ends 59 and 61 lie adjacent and spaced from the front side wall 36 and the rear side wall 38 respectively leaving a gap 79 at each end between the walls and the rotor 56. An axle 63 extends longitudinally through the rotor 56 and lies coaxial to the axis of rotation 57. The axle 63 includes a first end 65 adjacent the first end 59 of the rotor 56 and a second end 67 adjacent the second end 61 of the rotor 56. The first end 65 of the axle 63 is rotatably mounted on the front side wall 36 of the feeder body 14 and the second end 67 of the axle 57 is rotatably mounted on the rear side wall 38 of the feeder body 14. Rotor drive means 71 engage the first end 65 of the axle 57.

Anti-binding means are provided at the rotor 56 to prevent twine and feed from becoming wrapped around the rotor axle 63 causing the rotor 56 to bind. The anti-binding means comprise a curved plate 73 arranged at each end 59 and 61 of the elongate rotor 56. Each curved plate 73 extends from a respective one of the front and rear side walls 36 and 38 of the feeder body 14 over the axle 63 and across the gap 79 to a position over a respective end 59 and 61 of the elongate rotor 56. Each curved plate 73 is elongate having a first end 75 and a second end 77 and is arranged around at least a portion of the circumference of the elongate rotor 56 such that the curved plate 73 extends from the first end 75 lying above the elongate rotor 56 downwards in a direction towards the traveling bed 68 and around and underneath the elongate rotor 56 to the second end 77.

Figure 3:
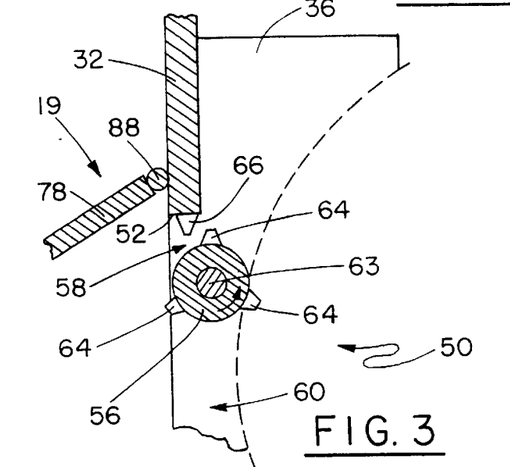
FIG. 3 is a cross section of the cutting blades.

The bale opening means 18 include cutting means for engaging the bale thereby removing a portion of the bale. The cutting means comprise cutting blades 64, which are sickle knives fixed to and spaced longitudinally along the rotor 56. The sickle knives are triangular in shape, have a blunted point, a serrated edge, and are oriented circumferentially on the rotor. Additional cutting blades 66 may be fixed to the top edge 52 of the opening 50 and if so are spaced longitudinally along the top edge 52 to interleave with the cutting blades 64 on the rotor 56. The additional blades 66 are also sickle knives like those mounted on the rotor 56. As the rotor 56 is rotated the cutting blades 64 engage the bale 11 with an upwards motion opening the bale, cutting and directing material cut from the bale 11 upwards through the upper gap 58 as a first cut portion. Any cut material falling from the bale 11 to below the cutting blades 64 falls to the bottom of the feeder body 14 and is fed through the lower gap 60 of the opening 50 by the traveling bed 68 as a second cut portion. The upwards action of the cutting blades 64 causes the bale 11 to rotate slightly thereby enhancing the opening action of the cutting blades 64.

The upwards motion of the rotor 56 and the cutting blades 64 cut the bale 11 such that the feed is not damaged by excessive removal of leaves from the stems of the feed or by shredding the feed into small pieces. The upwards movement of the feed after cutting provides for superior removal of dust and mold from the feed. Both the first and second cut portions of the bale 11 pass through the opening 50 after cutting and are directed downwards to the ground forming a row as the bale feeder 10 moves across the ground.

Referring to FIGS. 1, 2, 6, and 7 the bale opening means 18 includes the traveling bed 68 which feeds the bale 11 into the rotor 56 and feeds the second cut portion of the bale 11 through the lower gap 60 of the opening 50. The traveling bed 68 is arranged adjacent the open bottom 30 of the feeder body 14 for supporting the bale 11 and for feeding the bale 11 into the bale opening means 18.

Figure 6:
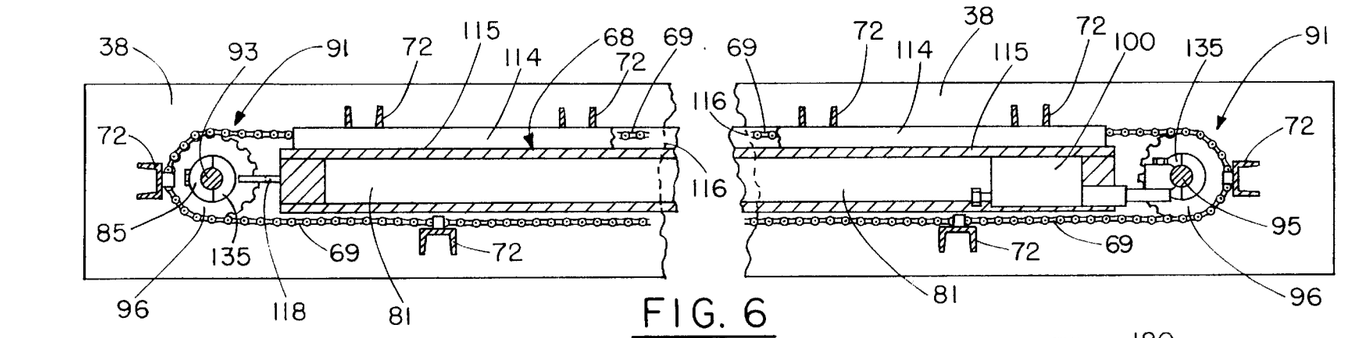
FIG. 6 is a side view of the traveling bed through B—B of FIG. 1.
Figure 7:
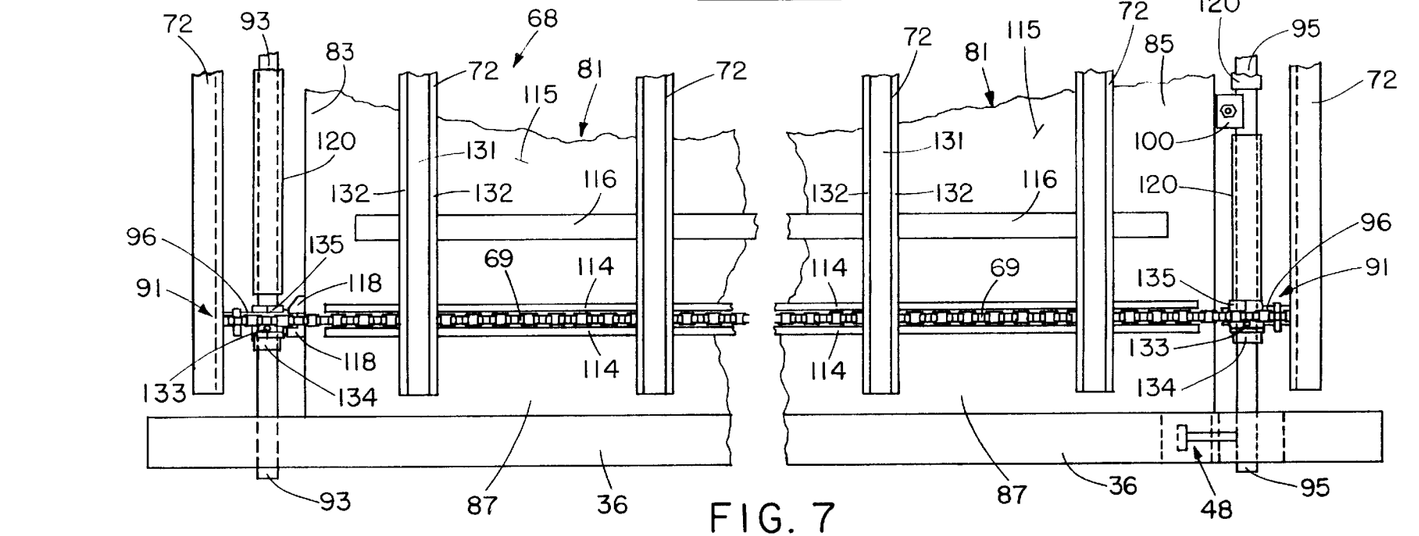
FIG. 7 is a top view of one side of the traveling bed.

The traveling bed 68 includes a deck 81 extending between a first side 83, a second side 85, a front end 87, and a rear end 89. The deck 81 is fixed to the front side wall 36 at the front end 87, to the rear side wall 38 at the rear end 89, and extends across the open bottom 30 of the feeder body 14.

The traveling bed comprises three conveyor chains 69 each being arranged substantially perpendicular to the elongate rotor 56, drive means 91 for driving the conveyor chains 69, and a plurality of spaced apart slats 72 fixed laterally across the conveyor chains 69 for supporting the bale 11 from below.

The drive means 91 include a drive shaft 93 and an idler shaft 95 arranged at each of the first and second ends 83 and 85 respectively of the deck 81. The shafts 93 and 95 are spaced apart from each other and arranged substantially parallel to the first side wall 32 and to one another. The drive shaft 93 is arranged adjacent the first side wall 32 and the idler shaft 95 is arranged adjacent the second side wall 34. Three sprockets 96 are spaced apart along and mounted on each of the drive and idler shafts 93 and 95. The sprockets 96 are arranged such that each sprocket 96 on the drive shaft 93 is aligned with a corresponding sprocket 96 on the idler shaft 95. The sprockets 96 are also arranged on each of the shafts such that one sprocket lies adjacent each end of the shaft 93 or 95 and is fixed to the shaft 93 or 95 by a set screw 133. These sprockets 96 are further secured against movement along the shaft 93 or 95 by a bushing 134, and a split collar 135 arranged one on either side of the sprocket 96. The remaining sprocket 96 on each shaft 93 or 95 lies between each of the other two sprockets 96 and is also fixed to the shaft 93 or 95 by a set screw 133. This sprocket 96 is further secured against movement along the shaft 93 or 95 by a pair of split collars 135 arranged one on each side of the sprocket 96.

Each conveyor chain 69 extends across and around a pair of aligned sprockets 96 such that it extends around, above, and below the deck 81 in a loop. The slats 72 travel around the loop and across the top of the deck 81 in a direction towards the first side wall 32 when the traveling bed 68 is operated in a forward direction. The slats 72 travel around the loop and across the top of the deck 81 in a direction away the first side wall 32 when the traveling bed 68 is operated in a reverse direction. The traveling bed 68 can be operated in reverse direction to clear the rotor 56 or when positioning of the bale 11 during loading if this is necessary.

Each of the slats 72 comprises a channel with a web 131 secured to the conveyor chains and two flanges 132 extending from the web 131. The flanges 132 are arranged to extend upwards when the slat 72 is traveling over the top of the deck 81.

Referring to FIGS. 6 to 9 a pair of chain tensioning means 98 are arranged such that one chain tensioning means 98 lies adjacent each respective end of the idler shaft 95 for repositioning the idler shaft 95 horizontally relative to the driven shaft 93. A shaft support 100 is arranged between the ends of idler shaft 95 for engaging a portion of the idler shaft 95 at a location opposite the driven shaft 93 for supporting the idler shaft 95 horizontally thereby limiting or eliminating deflection of the idler shaft 95.

Figure 9:
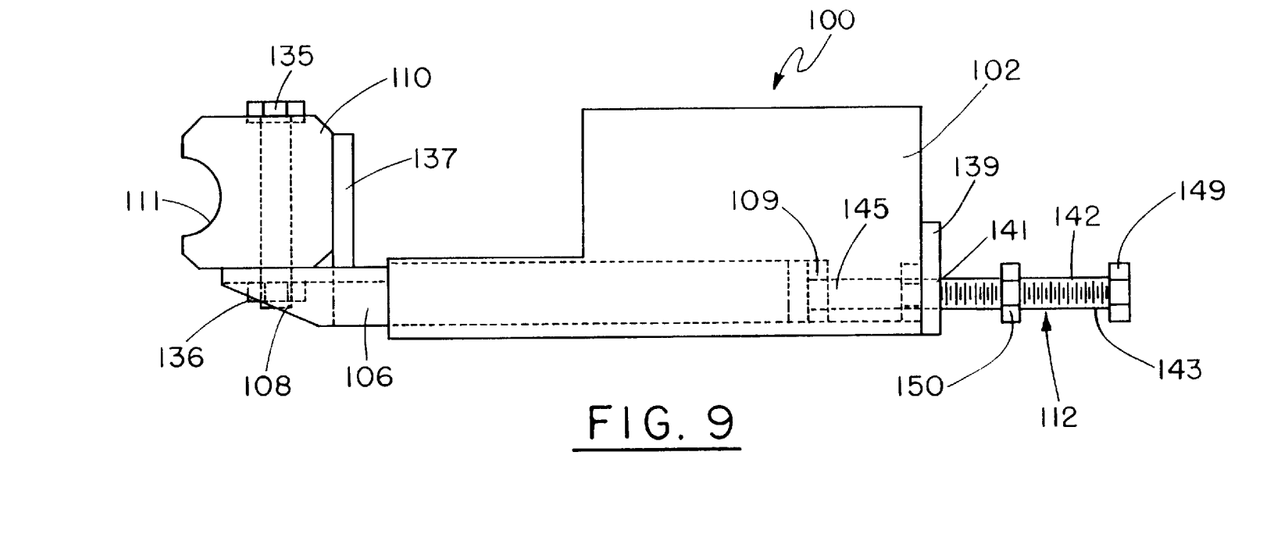
FIG. 9 is a side view of the shaft support.
Figure 10:
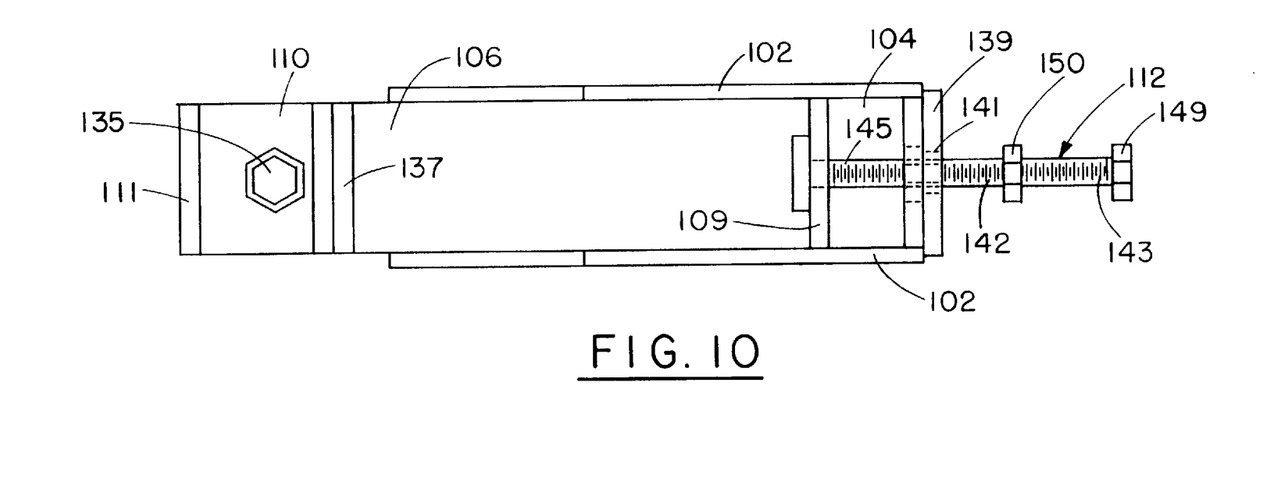
FIG. 10 is a top view of the shaft support.

The shaft support 100 comprises a pair of spaced apart plates 102 arranged adjacent the idler shaft 95 and fixed to the deck 81 and thus the body 14 of the feeder 10. A space 104 extends between the plates 102 and is aligned with and substantially perpendicular to the idler shaft 95. A slide block 106 is slidably arranged within the space 104 and has a first end 108 and a second end 109. The first end 108 extends outwards from the space 104 towards the idler shaft 95. A journal bearing 110 having a curved bearing face 111 is mounted on top of the slide block 108 with a bolt 135 and a nut 136 adjacent the first end 108 of the slide block 106. The journal bearing 110 is supported horizontally on the slide block 108 by a stop plate 137 arranged opposite the contact face 111. Actuating means 112 are arranged for selectably repositioning the slide block 106 within the space 104 such that the contact face 111 of the journal bearing 110 may be positioned to engage the idler shaft 95.

The actuating means 112 comprises a retainer plate 139 extending between the plates 102 and across the space 104. A bore 141 extends through the retainer plate 139 and lies inline with the slide block 106. A bolt 142 is aligned with the bore 141 and has a first end 143 arranged adjacent the plates 102 and extends through the bore 141 to a second end 145 arranged between the plates 102. The bolt 142 has a hex head 149 arranged at the first end 143. The second end 145 of the bolt 142 is fixed to the second end 109 of the slide block 106 such that the bolt 142 is free to rotate. A lock nut 150 is arranged on the bolt 142 between the retainer plate 139 and the first end 143 of the bolt 142. Turning the bolt 142 in a first direction causes the slide block 106 to move in a direction towards the shaft 95, and turning the bolt 142 in a direction opposite causes the slide block 106 to move in a direction away from the shaft 95

The referring to FIGS. 6 and 7 the traveling bed 18 also includes three chain guides each one comprising a pair of spaced apart rod members 114 fixed to the top surface 115 of the deck 81 and extending from the adjacent the first side 83 of the deck 81 to adjacent the second side 85 of the deck 81 and along either side of each one of the conveyor chains 69. The chain guides 114 constrain the conveyor chains 69 laterally helping to prevent the chains from coming off of the sprockets 96.

The traveling bed also includes two support members 116, fixed to the top surface 115 of the deck 81. The support members 116 extend from adjacent the first side 83 of the deck 81 to adjacent the second side 85 of the deck 81 and are arranged to support the slats 72 from below restricting vertical deflection of the slats 72 when the slats 72 are supporting a bale 11.

Figure 8:
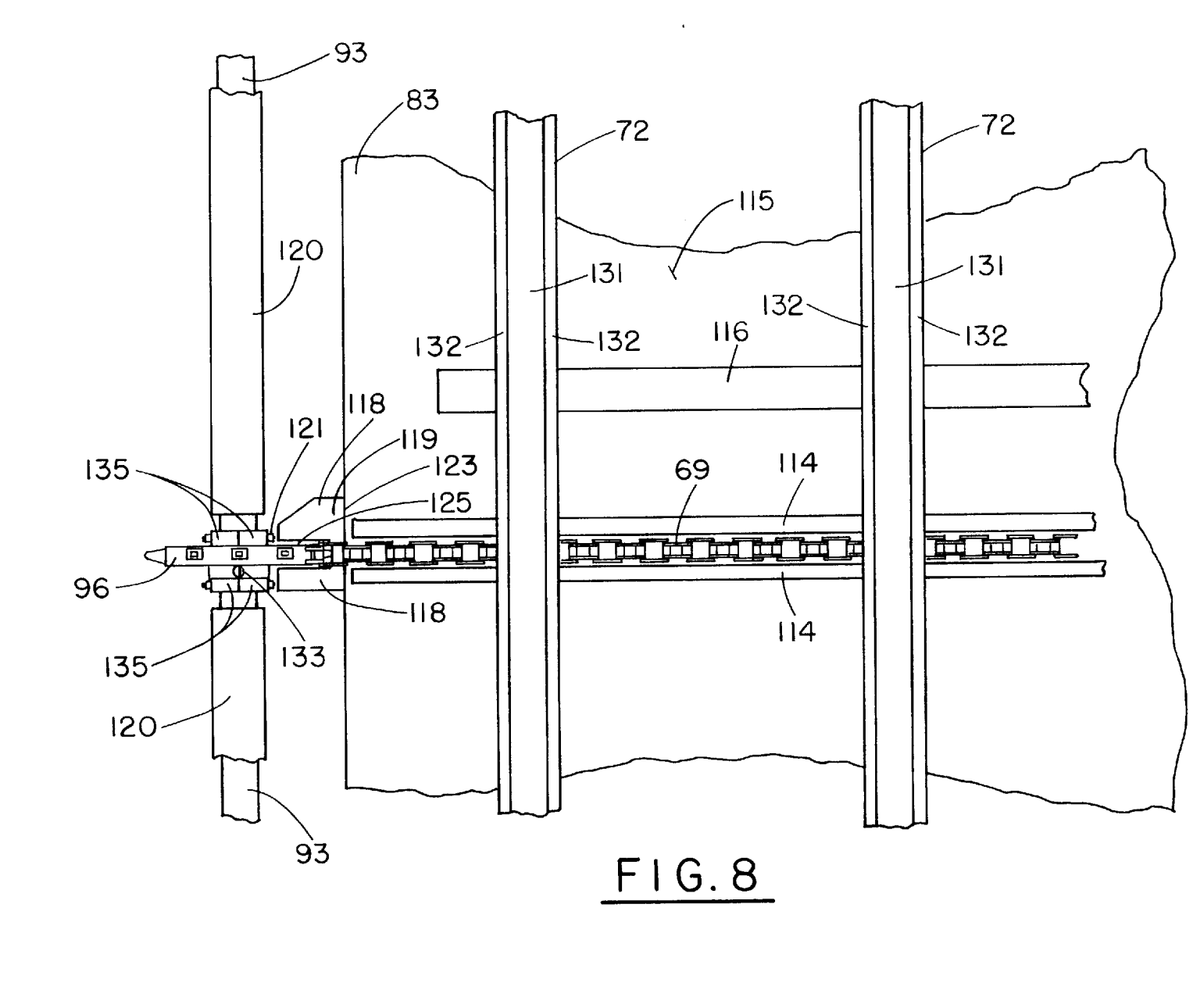
FIG. 8 is a top view the traveling bed anti-binding means.

The traveling bed 68 also includes anti-binding means for preventing cut animal feed and twine from binding in the conveyor chains 69 and the drive means 91. The anti-binding means comprise three pairs of cutting blades 118. Each pair of cutting blades 118 comprises a plate 119 having a first side 121 and a second side 123 arranged opposite the first side 121. Each plate 119 includes a notch 125 in the first side 121 which extends into the plate 119 defining the pair of cutting blades 118, with one blade 118 lying to each side of the notch 125. Each plate 119 is fixed along its the second side 123 to the first end 83 of the deck 81, adjacent the drive shaft 93 and adjacent a respective one of the sprockets 96. Each plate 119 is arranged such that the sprocket 96 lies within the notch 125 with one of the blades 118 lying to each side of the sprocket 96 and extending towards the shaft 93.

The cutting blades 118 cut the twine or feed by a shearing action. Twine, feed, or other material which is picked up by, or falls onto, one of the sprockets 96 is carried by the sprocket 96 as the sprocket rotates. As the sprocket 96 passes between the blades 118 the material comes into contact with one or more of the blades 118 which shear the material. This limits the build up of twine, feed, or other materials on the sprocket 96 thereby reducing the risk of binding and slipping of the chain 69.

The anti-binding means also include sleeve members 120 arranged around and along portions of the drive and idler shafts 93 and 95. The sleeve members 120 are arranged to rotate freely on the shafts 93 and 95 and prevent twine and feed from wrapping around the shafts.

Referring to FIGS. 2 and 3 the bale feeder 10 includes feed directing means for directing the first and second cut portions of the bale 11 to a location external of the bale feeder. The feed directing means is a shroud 19 having an upper wall 78 connected along its upper edge 80 by a hinge 88 to the first wall 32 adjacent the top edge 52 of the opening 50. The upper wall 78 slopes downwards and outwards from the first edge 80 to a second edge 82. A substantially vertical side wall 84 extends downwards from the second edge 82 of the upper wall 78 to a free edge 86. The material removed from the bale 11 passes through the opening 50 and is directed downwards by the upper wall 78 and the side wall 84 to the ground forming a row as it falls to the ground and as the bale feeder 10 moves across the ground.

The hinge 88 allows the shroud 19 to pivot upwardly against the wall 32, providing for easy access to the opening 50 and bale opening means 18. Pivoting the shroud 19 upwards also narrows the unit for transport.

Referring to FIGS. 1 and 2 a receptacle 122 is mounted on the second side wall 34. The receptacle 122 comprises a pair of spaced apart sides 124 extending downwards from the side wall 34 and a bottom 126 extending between the side walls 34. An opening 128 is arranged to receive one or more counter weights 130. The counter weights 130 counter the weight of the bale 11 as the bale 11 is being fed into the rotor 56 on the opposite side of the feeder 10 and thereby improves the stability of the bale feeder 10 particularly when large bales are being shredded.

In an alternative embodiment the feeder may be mounted on a vehicle in a self-propelled configuration.

In a further alternative arrangement the feeder may be mounted on a fixed frame and have a conveyor or other suitable means of distributing the feed arranged at the feed directing means.

While one embodiment of the present invention has been described in the foregoing, it is to be understood that other embodiments are possible within the scope of the invention. The invention is to be considered limited solely by the scope of the appended claims.

We claim:

1. A bale feeder for opening a round bale of animal feed, said bale being held together by at least one length of twine, said bale feeder comprising:
   a feeder body for receiving the bale, said feeder body having a first side wall;
   a bale opening means including:
      an opening in the first side wall of the feeder body;
      an elongate rotor extending across the opening;
      cutting means distributed around and along the rotor and being fixed thereto for engaging the bale and cutting a portion thereof;
      a rotor drive means for rotating the rotor;
      a traveling bed arranged adjacent a bottom of the first side wall and interior to the feeder body for supporting the bale and for continuously feeding the bale into the cutting means, said traveling bed comprising at least one conveyor chain arranged substantially perpendicular to the elongate rotor, drive means for driving the conveyor chain comprising a first shaft and at least one sprocket mounted on the first shaft for engaging the at least one conveyor chain;
   and anti-binding means for preventing cut animal feed and twine from binding in the drive means, said anti-binding means comprising at least one cutting blade mounted on the feeder body adjacent the first shaft such that the at least one cutting blade lies adjacent and laterally of the at least one sprocket.

2. A bale feeder in accordance with claim 1 wherein the opening includes a top edge, and wherein the elongate rotor is spaced downwards from the top edge of the opening leaving an upper gap above said rotor, and arranged such that the rotor drive means rotate the rotor in a direction to engage the bale with an upwards motion such that a cut portion of the bale is directed upwards through the upper gap of the opening.

3. A bale feeder in accordance with claim 2 wherein the position of the rotor within the opening is variable in a vertical plane allowing the bale feeder to be used with various sizes of bales.

4. A bale feeder in accordance with claim 1 wherein the at least one cutting blade comprises a plate having a first side fixed to the feeder body, a free second side, and a notch extending into the second side of the plate defining a pair of cutting blades with one blade lying on each side of the notch, and wherein the plate is arranged such that the at least one sprocket lies within the notch with one of the pair of blades lying adjacent a respective side of the at least one sprocket.

5. A bale feeder in accordance with claim 1 wherein the drive means includes a second shaft spaced apart from the first shaft and arranged substantially parallel thereto and wherein the traveling bed includes a pair of chain tensioning means, each being arranged at a respective end of the second shaft for repositioning the second shaft horizontally relative to the first shaft, and wherein the traveling bed includes a shaft support arranged between the ends of the second shaft for engaging a portion of the second shaft at a location opposite the first shaft for moving said portion of the second shaft horizontally relative to the first shaft thereby reducing deflection of the second shaft.

6. A bale feeder in accordance with claim 1 wherein the traveling bed includes at least one chain guide, each at least one chain guide comprising a pair of spaced apart guide members, each guide member being arranged along a respective side of the at least one conveyor chain such that said conveyor chain is constrained laterally thereby.

7. A bale feeder in accordance with claim 1 wherein the traveling bed includes a plurality of spaced apart slats fixed laterally across the at least one conveyor chain for supporting the bale thereon, and at least one support member arranged to support the slats from below thereby restricting vertical deflection of the plurality of slats when said slats are supporting a bale.

8. A bale feeder for opening a round bale of animal feed, said bale being held together by at least one length of twine, said bale feeder comprising:
a feeder body for receiving the bale, said feeder body having a first side wall;
a bale opening means including:
an opening in the first side wall of the feeder body;
an elongate rotor extending across the opening;
cutting means distributed around and along the rotor and being fixed thereto for engaging the bale and cutting a portion thereof;
a rotor drive means for rotating the rotor;
a traveling bed arranged adjacent a bottom of the first side wall and interior to the feeder body for supporting the bale and for continuously feeding the bale into the cutting means, said traveling bed comprising: at least one conveyor chain arranged substantially perpendicular to the elongate rotor, drive means for driving the conveyor chain comprising a first shaft arranged adjacent the first wall, a second shaft spaced from the first shaft, and at least one sprocket mounted on each shaft for engaging the at least one conveyor chain;
and anti-binding means for preventing cut animal feed and twine from binding in the drive means, said anti-binding means comprising at least one sleeve member arranged around and along at least a portion of at least one of the first and second shafts, said at least one sleeve member being arranged to rotate freely on said shaft.

9. A bale feeder in accordance with claim 8 wherein the traveling bed includes at least one chain guide, each at least one chain guide comprising a pair of spaced apart guide members, each guide member being arranged along a respective side of the at least one conveyor chain such that said conveyor chain is constrained laterally thereby, and wherein the traveling bed includes a plurality of spaced apart slats fixed laterally across the at least one conveyor chain for supporting the bale thereon, and at least one support member arranged to support the slats from below thereby restricting vertical deflection of the plurality of slats when said slats are supporting a bale.

10. A bale feeder in accordance with claim 9 wherein the opening includes a top edge, and wherein the elongate rotor is spaced downwards from the top edge of the opening leaving an upper gap above said rotor, and arranged such that the rotor drive means rotate the rotor in a direction to engage the bale with an upwards motion such that a cut portion of the bale is directed upwards through the upper gap of the opening.

11. A bale feeder in accordance with claim 10 wherein the position of the rotor within the opening is variable in a vertical plane allowing the bale feeder to be used with various sizes of bales.

12. A bale feeder for opening a round bale of animal feed, said bale being held together by at least one length of twine, said bale feeder comprising:
a feeder body for receiving the bale, said feeder body having a a front wall, a rear wall spaced from the front wall, and a side wall extending therebetween;
a bale opening means including:
an opening in the side wall of the feeder body;
an elongate rotor extending across the opening and having a first end and a second end arranged such that the first end lies adjacent the front wall and the second end lies adjacent the rear wall;
cutting means distributed around and along the rotor and being fixed thereto for engaging the bale and cutting a portion thereof;
a rotor drive means for rotating the rotor;
a bale conveyor means for feeding the bale into the cutting means;
and anti-binding means arranged at each end of the elongate rotor for preventing cut animal feed and twine from binding in the elongate rotor, said anti-binding means comprising a curved plate arranged at each end of the first and second ends of the elongate rotor, each said curved plate being fixed to a respective one of the front and rear sides of the feeder body and extending over a respective end of the elongate rotor and around at least a portion of a circumference thereof.

13. A bale feeder in accordance with claim 12 wherein the opening includes a front side adjacent the front wall and a rear side adjacent the rear wall and wherein the elongate rotor is arranged such that there is a gap between each one of the first and second ends thereof and a corresponding one of the front and rear walls, and wherein the elongate rotor includes an axle extending longitudinally therethrough, said axle having a first end mounted on adjacent the front side of the opening and a second end mounted adjacent the rear side of the opening, and wherein each curved plate extends from a respective one of the front and rear walls of the feeder body over the axle and across a respective gap.

14. A bale feeder in accordance with claim 12 wherein each said curved plate comprises an elongate member having a first end and a second end, said elongate member being arranged to extend from the first end lying above the elongate rotor downwards in a direction towards the bale conveyor means and around and underneath the elongate rotor to the second end.

15. A bale feeder in accordance with claim 12 wherein the opening includes a top edge, and wherein the elongate rotor is spaced downwards from the top edge of the opening leaving an upper gap above said rotor, and wherein the rotor drive means rotate the rotor in a direction to engage the bale with an upwards motion such that a cut portion of the bale is directed upwards through the upper gap of the opening.

16. A bale feeder in accordance with claim 15 wherein the position of the rotor within the opening is variable in a vertical plane allowing the bale feeder to be used with various sizes of bales.

17. A bale feeder in accordance with claim 12 wherein the cutting means comprise cutting blades fixed to and spaced longitudinally along a top edge of the opening.

18. A bale feeder in accordance with claim 12 wherein the bale feeder includes a bale lifting means for engaging the bale and lifting it off of the ground, for supporting the bale above the ground for transportation, and for loading the bale into the feeder body for opening.

19. A bale feeder in accordance with claim 12 wherein the bale conveyor means comprise a traveling bed arranged adjacent the bottom end of the first side wall of the feeder body for supporting the bale and for continuously feeding the bale into the cutting means.

20. A bale feeder in accordance with claim 12 including feed directing means arranged at the opening for directing the cut portion of the bale to a location external of the bale feeder, said feed directing means including a hinge means for pivoting the feed directing means upwards and away from the opening and bale opening means to allow access to said opening and bale opening means.

* * * * *